(12) United States Patent
Saito

(10) Patent No.: US 6,584,282 B2
(45) Date of Patent: Jun. 24, 2003

(54) FINDER OPTICAL SYSTEM AND CAMERA HAVING THE SYSTEM

(75) Inventor: Hiroshi Saito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/471,022

(22) Filed: Dec. 23, 1999

(65) Prior Publication Data

US 2002/0159772 A1 Oct. 31, 2002

(30) Foreign Application Priority Data

Dec. 30, 1998 (JP) .......................................... 10-377640

(51) Int. Cl.⁷ ................................................. G03B 13/10
(52) U.S. Cl. ........................... 396/97; 396/379; 348/341
(58) Field of Search ....................... 396/97, 373, 378, 396/379, 384, 385, 386, 353; 359/689; 348/341

(56) References Cited

U.S. PATENT DOCUMENTS

| | | | | |
|---|---|---|---|---|
| 4,659,187 A | * | 4/1987 | Tsuji et al. | 359/688 |
| 5,386,320 A | * | 1/1995 | Takada | 359/689 |
| 5,621,568 A | * | 4/1997 | Hasushita et al. | 359/432 |
| 5,679,946 A | * | 10/1997 | Mukai et al. | 250/201.2 |
| 5,966,244 A | * | 10/1999 | Mukai et al. | 359/647 |
| 5,973,855 A | * | 10/1999 | Shibayama | 359/691 |
| 6,052,225 A | * | 4/2000 | Hoshi | 359/432 |
| 6,058,273 A | * | 5/2000 | Abe | 396/384 |
| 6,084,720 A | * | 7/2000 | Kashiki | 359/676 |
| 6,144,805 A | * | 11/2000 | Ogino | 396/81 |

FOREIGN PATENT DOCUMENTS

| | | |
|---|---|---|
| EP | 0694799 | 1/1996 |
| JP | 2-230226 | 9/1990 |
| JP | 8-122854 | 4/1991 |
| JP | 8-94910 | 4/1996 |
| JP | 3-81748 | 5/1996 |

* cited by examiner

Primary Examiner—David M. Gray
(74) Attorney, Agent, or Firm—Fitzpatrick, Cella, Harper & Scinto

(57) ABSTRACT

A finder optical system for observing an object therethrough, includes a variable-power objective optical system, an eyepiece optical system for guiding light from the object via the objective optical system to an observer, and an adjustor for changing the optical characteristics of an image of the object observed by the observer through the eyepiece optical system based on information about the temperature of the finder optical system, the distance from the finder optical system to the object, and the zoom position of the objective optical system.

42 Claims, 3 Drawing Sheets

FINDER OPTICAL SYSTEM AND CAMERA HAVING THE SYSTEM

BACKGROUND OF THE INVENTION

1. Field of the Invention

The present invention relates to a finder optical system and a camera having the system, and more particularly, to a finder optical system having an eyesight-adjusting function of correcting the deviation of the optical characteristics of the image viewed through an eyepiece, depending on temperature.

2. Description of the Related Art

Japanese Patent Application Laid-Open Nos. 2-230226 and 3-81748 disclose techniques for correcting the deviation of the optical characteristics of the image viewed through an eyepiece, due to a change of subject distance in a real-image finder.

Japanese Patent Application Laid-Open No. 8-122854 discloses a technique for converting the deviation of the optical characteristics of the image viewed through an eyepiece, due to changes in temperature, humidity, brightness, and the like.

In the conventional art disclosed in Japanese Patent Application Laid-Open Nos. 2-230226 and 3-81748, however, it is impossible to correct deviation of the optical characteristics of the image viewed through an eyepiece, due to changes in temperature, and it is therefore difficult to achieve high finder magnification. An optical system having high finder magnification requires glass lenses, which increases the manufacturing costs.

In contrast, in the conventional art disclosed in Japanese Patent Application Laid-Open No. 8-122854, deviation of the optical characteristics of the image viewed through an eyepiece due to changes in temperature is corrected by a part of an eyepiece. However, when the deviation of the optical characteristics of the image viewed through an eyepiece with respect to a subject image is corrected by the eyepiece system, the visual field frame and the images displayed inside and outside the visual field frame are not clearly viewed. In a zooming optical system, since the extent of the optical characteristics of the image viewed through an eyepiece to be corrected substantially changes, the stroke of a correction lens is too great, and the amount of correction must be changed very much according to the zooming position, which enlarges and complicates the structure.

SUMMARY OF THE INVENTION

Accordingly, an object of the present invention is to overcome the above-described problems in the conventional art, and to provide a finder optical system in which a visual field frame and the images displayed inside and outside the visual field frame are clearly viewed even when the deviation of the optical characteristics of the image viewed through an eyepiece is corrected based on temperature information.

To achieve the above-noted object, according to one aspect, the present invention relates to a finder optical system for observing an object therethrough, comprising a variable-power objective optical system, an eyepiece optical system for guiding light from the object via the objective optical system to an observer, and adjustment means for changing the optical characteristics of an image of the object observed by the observer through the eyepiece optical system based on information about the temperature of the finder optical system, the distance from the finder optical system to the object, and the zoom position of the objective optical system.

According to another aspect, the present invention relates to a finder optical system for observing an object, comprising an objective optical system, an eyepiece optical system for guiding light from the object via the objective optical system to an observer, and adjustment means for changing the imaging position of the objective optical system based on temperature information.

According to still another aspect, the present invention relates to a camera comprising a photographing optical system for forming an image of an object on a photosensitive plane, and a finder optical system for observing the object therethrough. The finder optical system comprises a variable-power objective optical system, an eyepiece optical system for guiding light from the object via the objective optical system to an observer; and adjustment means for changing the optical characteristics of an image of the object observed by the observer through the eyepiece optical system based on information about the temperature of the finder optical system, the distance from the finder optical system to the object, and the zoom position of the objective optical system.

According to still another aspect, the present invention relates to a camera comprising a photographing optical system for forming an image of an object on a photosensitive plane, and a finder optical system for observing the object therethrough. The finder optical system comprises an objective optical system, an eyepiece optical system for guiding light from the object via the objective optical system to an observer, and adjustment means for changing the imaging position of the objective optical system based on temperature information.

Further objects, features and advantages of the present invention will become apparent from the following description of the preferred embodiments with reference to the attached drawings.

DESCRIPTION OF THE PREFERRED EMBODIMENT

The present invention will be described in detail in connection with the illustrated embodiments.

Figure 1:
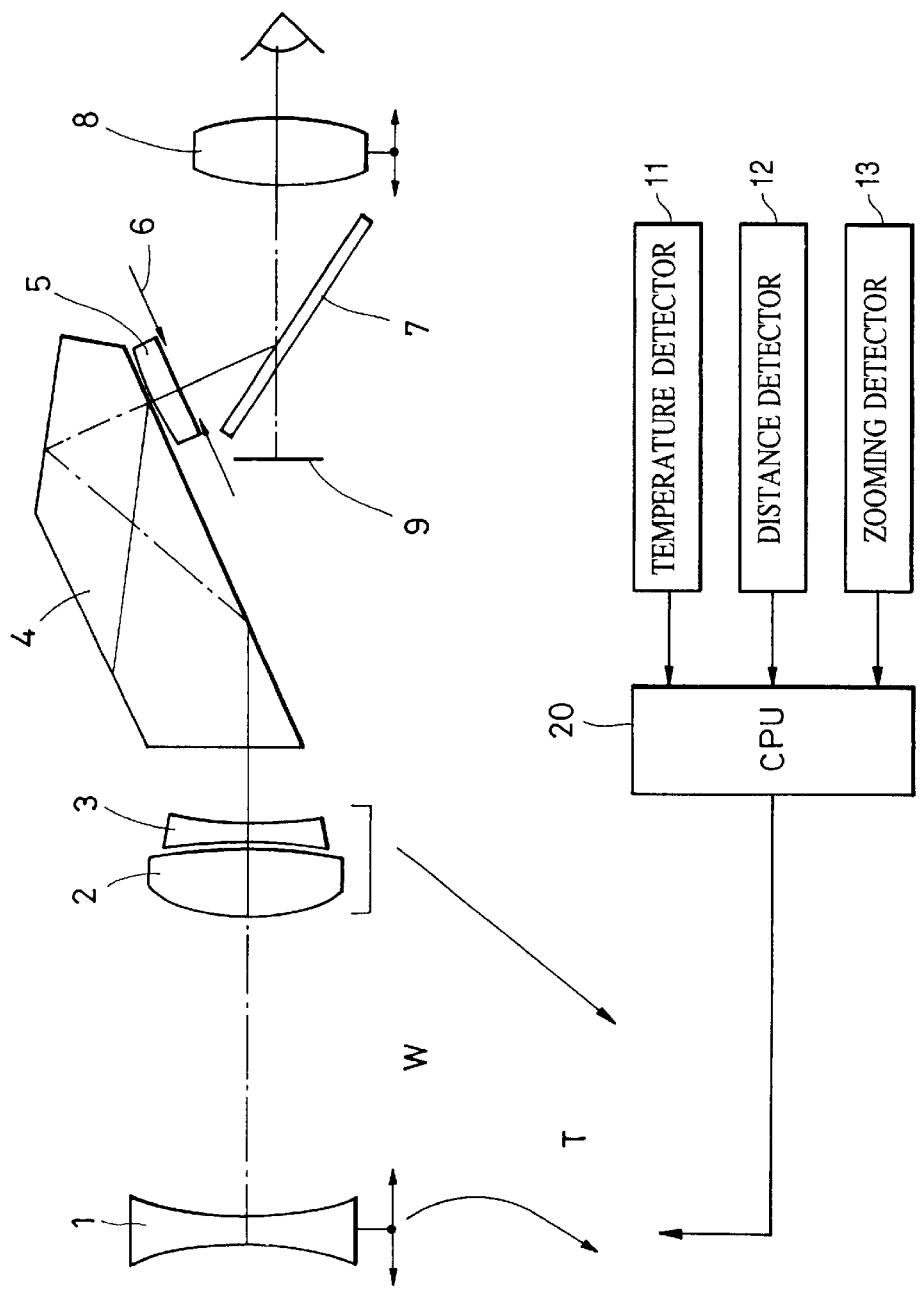
FIG. 1 is a schematic structural view of a finder optical system according to a first embodiment of the present invention.

FIG. 1 shows the configuration of a finder optical system in a camera also having a photographing optical system (not shown) according to a first embodiment of the present invention. Arranged from the side of a subject along the optical path in the finder optical system are an objective lens including a first lens unit consisting of a single lens element 1 and a second lens unit consisting of a single lens element 2 and a single lens element 3, a roof prism 4 for image inversion, a field lens 5, a visual field frame 6, a half mirror 7, and an eyepiece 8 that is movable in the direction of the optical axis thereof. An information display section 9 is placed behind (on the side opposite from a photographer) the half mirror 7. In the objective lens, the first lens unit has a negative power, and the second lens unit, which is a combination of the lens elements 2 and 3, has a positive power as a whole. With zooming from a wide-angle end W to a telephoto end T, the first lens unit (the lens element 1) and the second lens unit (the lens elements 2 and 3) move on the optical axis of the finder optical system, as shown by the arrows in FIG. 1, and the objective lens forms a subject image adjacent to the visual field frame 6.

The visual field frame 6 is visible from the eyepiece 8, in a manner similar to a subject image inside thereof, and the subject image and the visual field frame can be clearly viewed. The information display section 9 is placed at a position optically equivalent to that of the visual field frame 6, as seen from the eyepiece 8. The eyepiece 8 is designed to move forward and backward on the optical axis so as to adjust the power of the eyepiece system to the eyesight of the photographer. Accordingly, information about the autofocus (AF) distance measuring position, the parallax correction in macro photographing, and character information, such as shutter speed and f-number, are indicated in the information display section 9 so that they can be clearly viewed as well as the subject image and the visual field frame 6. The information may be displayed both inside and outside the visual field in the information display section 9.

In order to improve basic performance and to reduce costs, the lens elements 1, 2, and 3 constituting the objective lens are respectively made of acrylic, glass, and polycarbonate, the lens elements 1 and 3 are aspherical, and the lens element 2 is spherical.

In general, the plastic material undergoes greater linear expansion and greater changes in refractive index according to temperature than glass material, and the plastic lens changes to weaken its power as the temperature rises. In the objective lens of this embodiment using many plastic materials, therefore, changes in temperature substantially change the imaging position, and also change the optical characteristics of the image viewed through the eyepiece 8, referred to here as the eyesight through the eyepiece 8, or merely as the eyesight. Furthermore, the amount of change of the eyesight with temperature also varies depending on the zoom position of the objective lens. The eyesight through the finder changes according to the distance to the subject, and the amount of the change also varies depending on the magnification of the finder. In this embodiment, the magnification of the finder is set to be a maximum of 2.4 times.

In this embodiment, a temperature detector 11, a detector 12 for detecting the distance to the subject, and a detector 13 for detecting information about zooming (zoom position) are provided. Eyesight deviation is calculated by a calculation control unit (adjustment means) 20, comprising a central processing unit (CPU), based on the temperature, the subject distance, and zooming information detected by the detectors 11, 12, and 13, respectively, and the first lens unit (the lens element 1) in the objective lens is moved on the optical axis according to the calculation result to change the imaging position of the objective lens, thereby automatically correcting the eyesight deviation due to temperature. In this embodiment, the detector 12 for detecting the distance to the subject corresponds to an AF system of a camera, and the detector 13 for detecting the zooming information corresponds to a means for detecting the position of the lens units, which move for zooming, in the objective lens and the photographing optical system. These detectors 12 and 13 are provided in known zoom cameras having an AF function. In contrast, as the temperature detector 11, a temperature sensor or the like is required to be added to the known cameras.

Figure 2:
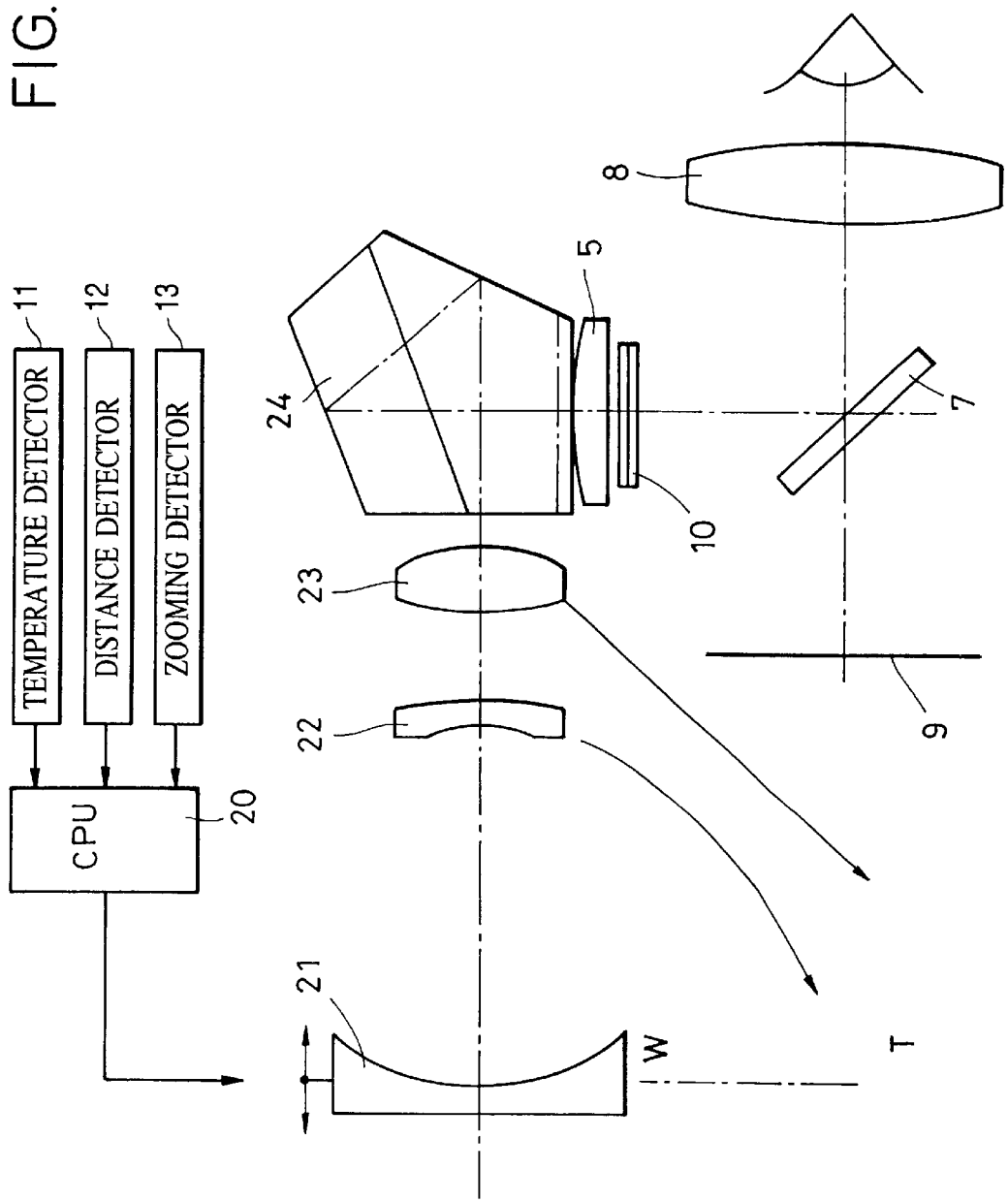
FIG. 2 is a schematic structural view of a finder optical system according to a second embodiment of the present invention.

FIG. 2 shows the configuration of a finder optical system according to a second embodiment of the present invention. The components having functions similar to those in the first embodiment are denoted by the same numerals. Instead of the visual field frame 6 in the first embodiment, a liquid crystal display 10 is placed adjacent to the imaging position of an objective lens so as to display a visual field frame and information. A lens element 21 of an objective lens forms a first lens unit having a negative power, a lens element 22 forms a second lens unit having a negative power, and a lens element 23 forms a third lens unit having a positive power. A prism 24 is provided between lens 23 and lens 5 for image inversion. During zooming from a wide-angle end to a telephoto end, the second and third lens units move, as shown in FIG. 2, whereas the first lens unit does not move. The lens elements 21, 22, and 23 constituting the objective lens are respectively made of acrylic, polycarbonate, and acrylic. In the finder optical system of this embodiment, information can be displayed in both the liquid crystal display 10 and an information display section 9, and this allows a complicated display in a plurality of colors as if the colors were superimposed.

The finder magnification of the objective lens in the second embodiment is set to be a maximum of 1.3 times. Furthermore, since the lens elements constituting the objective lens are made of plastic materials, the eyesight with respect to the objective lens substantially changes with temperature. In a manner similar to the first embodiment, the finder optical system has detectors 11, 12, and 13 for detecting temperature, the subject distance, and zooming information, respectively. The eyesight change is calculated by a calculation control unit 20 according to the information from the detectors, and the first lens unit (the lens element 21) in the objective lens is moved on the optical axis based on the calculation result, thereby automatically adjusting the eyesight. Since plastic components undergo greater manufacturing errors than glass components, the eyesight sometimes significantly changes particularly due to the manufacturing errors in the objective lens and the cam accuracy. In order to correct such manufacturing errors, the initial position of the lens element 21 on the optical axis is adjustable.

The present invention is also applicable to a finder optical system in which an erect image is obtained by a secondary imaging system using elements other than a prism for image inversion. In general, the secondary imaging system subjects a primary image formed by an objective lens to image formation by a plastic lens system, and therefore, requires multiple lenses. When multiple plastic lenses are used for the purpose of cost reduction, the amount of change in eyesight with temperature becomes large. The adoption of the configuration of the present invention to such a system is even more effective than the above embodiment.

As described above, according to the embodiments, eyesight adjustment is possible using a simple structure while the visual field frame 6 in the first embodiment and the liquid crystal display 10 in the second embodiment are maintained clearly visible. The amount of deviation of eyesight due to changes in temperature and subject distance substantially varies depending on the zoom position of the finder. In particular, eyesight change due to temperature changes is not simple because it is determined by the influences of changes in the refractive indices of the lenses, the coefficients of thermal expansion of the components, and the like. In an optical system having a high zooming ratio, the amount of deviation of eyesight generally increases as the magnification increases, and therefore, the amount of correction also increases.

For such eyesight adjustment, the mechanism for moving a specific part of the objective lens allows the amount of correction of eyesight to vary depending on the zooming position even when the amount of movement is constant. This can overcome the problems in excessive stroke of moving the correction lens and in too high a precision of movement.

In the optical system having such an eyesight adjustment mechanism, the primary imaging planes in the visual field frame 6 and the liquid crystal display 10 are maintained clearly visible from the eyepiece system even when the eyesight adjustment mechanism is being operated. Therefore, the optical system is effective particularly for an optical system in which a range-finding mark, a close-range field adjustment mark, the photographing size, and the like are displayed inside the visual field, and an optical system in which character information is displayed or a lamp indication is made outside the visual field.

In an optical system having a maximum finder magnification greater than 1.1 times, eyesight change due to a temperature change and eyesight change due to a change of the subject distance are too large as a whole. Since the zooming ratio and eyesight-change sensitivity are proportional to each other, eyesight is adjusted by moving a part of the objective lens, particularly, the lens element 1 closest to the object, which can reduce the size of the eyesight adjustment mechanism.

In the objective system in which zooming is performed by moving both the first lens unit having a negative power and the second lens unit having a positive power on the optical axis, the first lens unit is moved forward and backward on the optical axis to adjust eyesight. This reduces the number of the components, and achieves a reduction in size. Furthermore, the initial position of the first lens unit can be adjusted to correct the deviation of eyesight due to manufacturing errors in the lenses and the mechanical parts by using the eyesight adjustment mechanism, which reduces costs.

In general, an optical system having a high finder magnification requires high design performance and high component accuracy in order to improve visibility. For that reason, it is preferable, in view of basic performance and cost, that all the lenses in the objective lens not be made of plastic, that is, that some of the lenses be made of glass. However, since glass and plastic are substantially different in their change of refractive index and degree of linear expansion according to the temperature, it may be more difficult to cancel the change in eyesight than in a case in which all the lenses are made of glass or plastic, and as a result, eyesight may significantly change with temperature. By incorporating the eyesight adjustment mechanism in such a system, a finder optical system can be achieved which provides high magnification, high imaging performance, and high resistance to temperature.

Next, an example of a camera having the finder optical system according to the above-described first or second embodiment will be described with reference to FIGS. 3A and 3B.

Figure 3A:
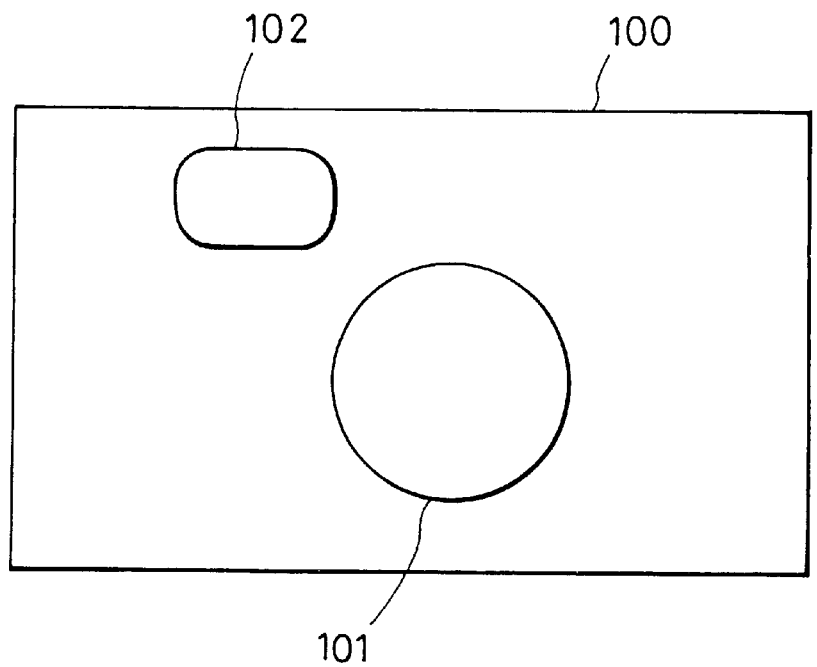
FIGS. 3A and 3B are front and sectional side views, respectively, of a camera having the finder optical system according to the first or second embodiment.
Figure 3B:
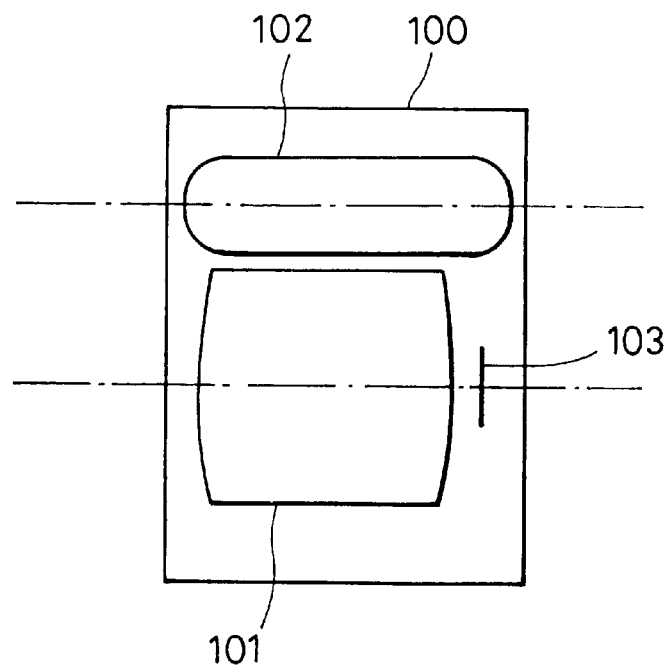

FIGS. 3A and 3B are front and sectional side views of the camera. Referring to these figures, the camera comprises a camera body (housing) 100, a photographing lens 101, a finder optical system 102 of the first or second embodiment, and a film 103 serving as a photosensitive plane. The photographing lens 101 serves as a photographing optical system for forming an image on the photosensitive plane of film 103.

Such application of the finder optical system of the first or second embodiment to the camera achieves a compact and high-performance camera in which the eyesight change depending on temperature, not on subject distance and zoom position, can be automatically adjusted.

Except as otherwise disclosed herein, the various components shown in outline or in block form in the figures are individually well-known and their internal construction and operation are not critical either to the making or using of this invention or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A finder optical system for observing an object therethrough, comprising:
    a variable-power objective optical system having an imaging position;
    an eyepiece optical system, which is capable of moving on an optical axis, for guiding light from the object via said objective optical system to an eye of an observer, thereby establishing a finder view;
    a visual field frame that is arranged on or near the imaging position;
    a temperature detector for detecting temperature information;
    a distance detector for detecting an object distance;
    a zooming detector for detecting a zoom position of said objective optical system; and
    an adjuster for changing the finder view based on the temperature information, the object distance, and the zoom position of said objective optical system.

2. A finder optical system according to claim 1, wherein said objective optical system has a lens made of a plastic material.

3. A finder optical system according to claim 1, further comprising an image inversion optical system for inverting an image of the object formed by said objective optical system.

4. A finder optical system according to claim 3, wherein said image inversion optical system is a secondary imaging optical system for subjecting the image of said object formed by said objective optical system again to image formation, and said secondary imaging optical system has a lens made of a plastic material.

5. A finder optical system according to claim 1, wherein said adjuster changes the finder view by changing the imaging position of said objective optical system.

6. A finder optical system according to claim 5, wherein said adjuster changes the imaging position of said objective optical system by moving at least a part of said objective optical system on the optical axis thereof.

7. A finder optical system according to claim 6, wherein said objective optical system includes a first lens unit having a negative refracting power and a second lens unit having a positive refracting power placed in that order from the side of the finder optical system closest to the object, and performs zooming by moving said first lens unit and said second lens unit on the optical axis.

8. A finder optical system according to claim 6, wherein said objective optical system includes a first lens unit having a negative refracting power, a second lens unit having a negative refracting power, and a third lens unit having a positive refracting power placed in that order from the side of the finder optical system closest to the object, and performs zooming by moving said second lens unit and said third lens unit on the optical axis, and wherein said adjuster changes the imaging position of said objective optical system by moving said first lens unit on the objective optical system.

9. A finder optical system according to claim 1, wherein said finder optical system has a maximum finder magnification greater than 1.1 times.

10. A finder optical system according to claim 1, wherein a change in the finder view resulting from manufacturing errors in a physical property of a lens of said finder optical system is corrected by moving at least a part of said objective optical system.

11. A finder optical system according to claim 1, further comprising an information display placed at a position optically equivalent to that of said visual field frame as seen from said eyepiece optical system, whereby an image of the object formed by said objective optical system and information displayed by said information display are viewable through said eyepiece optical system.

12. A finder optical system for observing an object, comprising:
  an objective optical system having an imaging position;
  an eyepiece optical system, which is capable of moving on an optical axis, for guiding light from the object via said objective optical system to an eye of an observer;
  a visual field frame that is arranged on or near the imaging position;
  a temperature detector for detecting temperature information; and
  an adjuster for changing the imaging position of said objective optical system based on the temperature information.

13. A finder optical system according to claim 12, wherein said objective optical system has a lens made of a plastic material.

14. A finder optical system according to claim 12, further comprising an image inversion optical system for inverting an image of the object formed by said objective optical system.

15. A finder optical system according to claim 14, wherein said image inversion optical system is a secondary imaging optical system for subjecting the image of said object formed by said objective optical system again to image formation, and said secondary imaging optical system has a lens made of a plastic material.

16. A finder optical system according to claim 12, wherein said adjuster changes the imaging position of said objective optical system by moving at least a part of said objective optical system on the optical axis thereof.

17. A finder optical system according to claim 16, wherein said objective optical system includes a first lens unit having a negative refracting power and a second lens unit having a positive refracting power placed in that order from the side of the finder optical system closest to the object, and performs zooming by moving said first lens unit and said second lens unit on the optical axis.

18. A finder optical system according to claim 16, wherein said objective optical system includes a first lens unit having a negative refracting power, a second lens unit having a negative refracting power, and a third lens unit having a positive refracting power placed in that order from the side of the finder optical system closest to the object, and performs zooming by moving said second lens unit and said third lens unit on the optical axis, and wherein said adjuster changes the imaging position of said objective optical system by moving said first lens unit on the objective optical system.

19. A finder optical system according to claim 12, wherein said finder optical system has a maximum finder magnification greater than 1.1 times.

20. A finder optical system according to claim 12, further comprising an information display placed at a position optically equivalent to that of said visual field frame as seen from said eyepiece optical system, whereby an image of the object formed by said objective optical system and information displayed by said information display are viewable through said eyepiece optical system.

21. A camera comprising:
  a photographing optical system for forming an image of an object on a photosensitive plane; and
  a finder optical system for observing said object therethrough, wherein said finder optical system comprises:
    (a) a variable-power objective optical system having an imaging position;
    (b) an eyepiece optical system, which is capable of moving on an optical axis, for guiding light from the object via said objective optical system to an eye of an observer, thereby establishing a finder view;
    (c) a visual field frame that is arranged on or near the imaging position;
    (d) a temperature detector for detecting temperature information;
    (e) a distance detector for detecting an object distance;
    (f) a zooming detector for detecting a zoom position of said objective optical system; and
    (g) an adjuster for changing the finder view based on the temperature information, the object distance, and the zoom position of said objective optical system.

22. A camera according to claim 21, wherein said objective optical system has a lens made of a plastic material.

23. A camera according to claim 21, further comprising an image inversion optical system for inverting an image of the object formed by said objective optical system.

24. A camera according to claim 23, wherein said image inversion optical system is a secondary imaging optical system for subjecting the image of said object formed by said objective optical system again to image formation, and said secondary imaging optical system has a lens made of a plastic material.

25. A camera according to claim 21, wherein said adjuster changes the finder view by changing the imaging position of said objective optical system.

26. A camera according to claim 25, wherein said adjuster changes the imaging position of said objective optical system by moving at least a part of said objective optical system on the optical axis thereof.

27. A camera according to claim 26, wherein said objective optical system includes a first lens unit having a negative refracting power and a second lens unit having a positive refracting power placed in that order from the side of the camera closest to the object, and performs zooming by moving said first lens unit and said second lens unit on the optical axis.

28. A camera according to claim 26, wherein said objective optical system includes a first lens unit having a negative refracting power, a second lens unit having a negative refracting power, and a third lens unit having a positive refracting power placed in that order from the side of the camera closest to the object, and performs zooming by moving said second lens unit and said third lens unit on the optical axis, and wherein said adjuster changes the imaging position of said objective optical system by moving said first lens unit on the objective optical system.

29. A camera according to claim 21, wherein said finder optical system has a maximum finder magnification greater than 1.1 times.

30. A camera according to claim 21, wherein a change in the finder view resulting from manufacturing errors in a physical property of a lens of said finder optical system is corrected by moving at least a part of said objective optical system.

31. A camera according to claim 21, wherein said finder optical system further comprises an information display placed at a position optically equivalent to that of said visual field frame as seen from said eyepiece optical system, whereby an image of the object formed by said objective optical system and information displayed by said information display are viewable through said eyepiece optical system.

32. A camera comprising:
   a photographing optical system for forming an image of an object on a photosensitive plane; and
   a finder optical system for observing said object therethrough, wherein said system comprises:
      (a) an objective optical system having an imaging position;
      (b) an eyepiece optical system, which is capable of moving on an optical axis, for guiding light from the object via said objective optical system to an eye of an observer;
      (c) a visual field frame that is arranged on or near the imaging position;
      (d) a temperature detector for detecting temperature information; and
      (e) an adjuster for changing the imaging position of said objective optical system based on the temperature information.

33. A camera according to claim 32, wherein said objective optical system has a lens made of a plastic material.

34. A camera according to claim 32, further comprising an image inversion optical system for inverting an image of the object formed by said objective optical system.

35. A camera according to claim 34, wherein said image inversion optical system is a secondary imaging optical system for subjecting the image of said object formed by said objective optical system again to image formation, and said secondary imaging optical system has a lens made of a plastic material.

36. A camera according to claim 32, wherein said adjuster changes the imaging position of said objective optical system by moving at least a part of said objective optical system on the optical axis thereof.

37. A camera according to claim 36, wherein said objective optical system includes a first lens unit having a negative refracting power and a second lens unit having a positive refracting power placed in that order from the side of the camera closest to the object, and performs zooming by moving said first lens unit and said second lens unit on the optical axis.

38. A camera according to claim 36, wherein said objective optical system includes a first lens unit having a negative refracting power, a second lens unit having a negative refracting power, and a third lens unit having a positive refracting power placed in that order from the side of the camera closest to the object, and performs zooming by moving said second lens unit and said third lens unit on the optical axis, and wherein said adjuster changes the imaging position of said objective optical system by moving said first lens unit on the objective optical system.

39. A camera according to claim 32, wherein said finder optical system has a maximum finder magnification greater than 1.1 times.

40. A camera according to claim 32, wherein said finder optical system further comprises an information display placed at a position optically equivalent to that of said visual field frame as seen from said eyepiece optical system, whereby an image of the object formed by said objective optical system and information displayed by said information display are viewable through said eyepiece optical system.

41. A finder optical system comprising:
   an objective optical system having an imaging position;
   an eyepiece optical system, which is capable of moving on an optical axis, for guiding light from an object via said objective optical system to an eye of an observer;
   a visual field frame that is arranged so that said objective optical system forms an image inside said visual field frame; and
   means for changing a position of a lens of said objective optical system in accordance with a detected temperature.

42. A finder optical system according to claim 41, further comprising an information display placed at a position optically equivalent to that of said visual field frame as seen from said eyepiece optical system, whereby an image of the object formed by said objective optical system and information displayed by said information display are viewable through said eyepiece optical system.

* * * * *

UNITED STATES PATENT AND TRADEMARK OFFICE
CERTIFICATE OF CORRECTION

PATENT NO. : 6,584,282 B2
DATED : June 24, 2003
INVENTOR(S) : Hiroshi Saito

It is certified that error appears in the above-identified patent and that said Letters Patent is hereby corrected as shown below:

<u>Title page,</u>
Item [*] Notice, should read:
-- [*]  Notice:  This patent issued on a continued prosecution application filed under 37 CFR 1.53(d), and is subject to the twenty year patent term provisions of 35 U.S.C. 154(a)(2). --

<u>Column 9,</u>
Line 34, "system comprises" should read -- finder optical system comprises --.

Signed and Sealed this

Twenty-seventh Day of January, 2004

JON W. DUDAS
*Acting Director of the United States Patent and Trademark Office*